(12) United States Patent
Senda

(10) Patent No.: US 6,442,192 B1
(45) Date of Patent: Aug. 27, 2002

(54) CDMA TYPE MULTIPLE TRANSMISSION APPARATUS AND CDMA TYPE MULTIPLE TRANSMISSION METHOD

(75) Inventor: Haruyasu Senda, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 127 days.

(21) Appl. No.: 09/698,155

(22) Filed: Oct. 30, 2000

Related U.S. Application Data

(63) Continuation of application No. PCT/JP99/01827, filed on Apr. 6, 1999.

(51) Int. Cl.[7] .......................... H04B 15/00; H04K 1/00; H04L 27/30
(52) U.S. Cl. .................. 375/146; 375/295; 375/296
(58) Field of Search .................. 375/146, 135, 375/141, 130, 133, 140, 221, 243, 261, 295, 296, 298; 370/335, 342, 441; 455/63, 67.3, 69, 70

(56) References Cited

U.S. PATENT DOCUMENTS

| | | | |
|---|---|---|---|
| 4,064,464 A | 12/1977 | Morse | ......................... 330/53 |
| 4,194,154 A | * 3/1980 | Kahn | ......................... 455/114 |
| 6,160,839 A | * 12/2000 | Zhang | ......................... 375/130 |
| 6,240,099 B1 | * 5/2001 | Lim et al. | ..................... 370/441 |

FOREIGN PATENT DOCUMENTS

| | | |
|---|---|---|
| JP | 6030059 | 2/1994 |
| JP | 6204959 | 7/1994 |
| JP | 879132 | 3/1996 |
| JP | 1041919 | 2/1998 |

* cited by examiner

*Primary Examiner*—Mohammad H. Ghayour
(74) *Attorney, Agent, or Firm*—Rothwell, Figg, Ernst & Manbeck

(57) ABSTRACT

Pieces of transmission data of channels are multiplexed with each other in a multiplexing unit to produce a base band signal, and the base band signal is orthogonally modulated in an orthogonal modulating unit to produce a transmission signal. The transmission signal is orthogonally demodulated in an orthogonal demodulating unit, the base band signal produced in the multiplexing unit is compared in a comparing unit (or a comparing and correcting unit) with the demodulated base band signal, and the base band signal is corrected in a vector adjusting unit (or the comparing and correcting unit) according to a compared result. Therefore, an electric power of the transmission signal can be precisely corrected without using an electric power table fitted to an electric power ratio of the pieces of transmission data, and the interference between channels can be prevented.

10 Claims, 4 Drawing Sheets

US 6,442,192 B1

CDMA TYPE MULTIPLE TRANSMISSION APPARATUS AND CDMA TYPE MULTIPLE TRANSMISSION METHOD

CROSS-REFERENCE TO THE RELATED APPLICATION

This application is a continuation of International Application No. PCT/JP99/01827, whose International filing date is Apr. 6, 1999, the disclosures of which Application are incorporated by reference herein.

BACKGROUND OF THE INVENTION

1. Field of the Invention

The present invention relates to a CDMA (code division multiple access) type multiple transmission apparatus and a CDMA type multiple transmission method in which an electric power of a transmission signal is controlled when pieces of transmission data of a plurality of channels are multiplexed with each other and are transmitted as the transmission signal.

2. Description of Related Art

FIG. 1 is a constitutional diagram of a conventional CDMA type multiple transmission apparatus. In FIG. 1, 1 indicates a channel section in which transmission data of a channel CH1 is multiplied by a spread code, 2 indicates a channel section in which transmission data of a channel CH2 is multiplied by a spread code, 3 indicates a channel section in which transmission data of a channel CH-N (N=3, 4, - - -) is multiplied by a spread code, 4 indicates a spread code generating unit for generating the spread code peculiar to the corresponding channel, and 5 indicates a mixer for multiplying the transmission data by the corresponding spread code.

Each of 6 to 8 indicates an electric power control unit for controlling an amplitude of the corresponding transmission data spread-modulated in the corresponding channel section 1, 2 or 3 and setting an electric power of the corresponding transmission data, 9 indicates a multiplexing unit for adding the pieces of transmission data output from the electric power control units 6 to 8 to each other to multiplex the pieces of transmission data with each other and outputting a base band signal (an isophase (I) component and a quadrature (Q) component), 10 indicates a digital-to-analog (D/A) converting unit for converting a digital signal, which indicates the base band signal output from the multiplexing unit 9, to an analog signal indicating the base band signal, 11 indicates a carrier wave generating unit for generating a carrier wave, and 12 indicates an orthogonal modulating unit for orthogonally modulating the base band signal, which is converted to the analog signal in the D/A converting unit 10, with the carrier wave generated in the carrier wave generating unit 11 and outputting a transmission signal.

13 indicates a variable attenuator for correcting the electric power of the transmission signal output from the orthogonal modulating unit 12 according to a correction signal output from a D/A converting unit 21, 14 indicates a radio transmitter for modulating the transmission signal, of which the electric power is corrected in the variable attenuator 13, to a transmission signal of a radio frequency band, 15 indicates a distributor for distributing the transmission signal output from the radio transmitter 14, and 16 indicates an antenna for radiating the transmission signal distributed in the distributor 15.

17 indicates a diode for detecting the electric power of the transmission signal distributed in the distributor 15 and outputting a detection signal indicating the electric power of the transmission signal, 18 indicates an analog-to-digital (A/D) converting unit for converting an analog signal indicating the detection signal to a digital signal indicating the detection signal, 19 indicates a data storing unit for storing an electric power table indicating the relationship between a summed value of the electric powers of the pieces of transmission data output from the electric power control units 6 to 8 and the electric power of the transmission signal to be output from the radio transmitter 14, 20 indicates an electric power correcting unit for measuring values of the electric powers of the pieces of transmission data output from the electric power control units 6 to 8 and outputting the correction signal according to the measured result and the detection signal, and 21 indicates the D/A converting unit for converting a digital signal, which indicates the correction signal output from the electric power correcting unit 20 to an analog signal indicating the correction signal.

Next, an operation is described.

To spread pieces of transmission data of the channels CH1 to CH-N so as to produce transmission data of a wide frequency band for each channel, in each of the channel sections 1 to 3 corresponding to the channels CH1 to CH-N, the transmission data of a corresponding channel is multiplied by a spread code peculiar to the corresponding channel, and the pieces of transmission data of the channels CH1 to CH-N are respectively spread-modulated.

After the pieces of transmission data of the channels CH1 to CH-N are respectively spread-modulated in the channel sections 1 to 3, amplitudes of the pieces of transmission data of the channels CH1 to CH-N are respectively controlled in the electric power control units 6 to 8 to set electric powers of the pieces of transmission data of the channels CH1 to CH-N to prescribed electric power values set in advance.

After the amplitudes of the pieces of transmission data of the channels CH1 to CH-N are controlled in the electric power control units 6 to 8, the pieces of transmission data of the channels CH1 to CH-N output from the electric power control units 6 to 8 are added to each other in the multiplexing unit 9 to be multiplexed with each other, and a base band signal composed of an I component and a Q component is output.

After a digital signal indicating the base band signal is converted to an analog signal indicating the base band signal in the D/A converting unit 10, the analog base band signal is orthogonally modulated in the orthogonal modulating unit 12 by using a carrier wave generated in the carrier wave generating unit 11, and a transmission signal is output.

After the transmission signal is output from the orthogonal modulating unit 12, the electric power of the transmission signal is corrected in the variable attenuator 13 according to a correction signal output from the D/A converting unit 21.

More precisely, though the electric powers of the pieces of transmission data are set in the electric power control units 6 to 8, because there is a case where an electric power of the transmission signal radiated from the antenna 16 deviates from a desired value for electric power (in cases where the electric power of the transmission signal deviates from a desired value for electric power, a channel corresponding to the transmission data of a high electric power may interfere with a channel corresponding to the transmission data of a low electric power), the electric power of the transmission signal is corrected in the variable attenuator 13 according to the correction signal.

For example, in cases where the correction signal indicates the heightening of the electric power of the transmission signal, the electric power of the transmission signal is corrected to heighten the electric power of the transmission signal. In contrast, in cases where the correction signal indicates the lowering of the electric power of the transmission signal, the electric power of the transmission signal is corrected to lower the electric power of the transmission signal. A method of producing the correction signal is described later.

After the electric power of the transmission signal is corrected in the variable attenuator 13, the transmission signal is modulated to a transmission signal of a radio frequency band in the radio transmitter 14, and the transmission signal is radio-transmitted through the antenna 16.

Therefore, the transmission signal is radio-transmitted. However, in cases where the electric power of the transmission signal deviates from a desired value for electric power, to set the electric power of the transmission signal to the desired electric power value, the electric power of the transmission signal distributed in the distributor 15 is detected in the diode 17, and a detection signal indicating the electric power of the transmission signal is output.

Thereafter, when the pieces of transmission data are output from the electric power control units 6 to 8, the electric powers of the pieces of transmission data are measured in the electric power correcting unit 20. The electric power of each piece of transmission data is, for example, measured by substituting an I component and a Q component of the transmission data into a following equation for I and Q and converting the I component and the Q component to values equivalent to the electric powers of the I and Q components.

$$\text{electric power of transmission data} = (I^2 + Q^2)^{1/2}$$

After the electric power of each piece of transmission data is measured, the electric power correcting unit 20 searches the electric power table stored in the data storing unit 19 for an electric power value (a desired electric power value) of the transmission signal corresponding to a summed value of the electric powers of the pieces of transmission data.

After the desired electric power value is retrieved from the electric power table, the desired electric power value is compared in the electric power correcting unit 20 with the electric power value (that is, an analog detection signal output from the A/D converting unit 18) of the transmission signal transmitted from the antenna 16. In cases where the desired electric power value agrees with the electric power value of the transmission signal, the electric power of the transmission signal does not deviate from a desired value for electric power. In contrast, in cases where the desired electric power value does not agree with the electric power value of the transmission signal, because the electric power of the transmission signal deviates from a desired value for electric power, a correction signal depending on the difference between the electric power of the transmission signal and the desired electric power value is produced in the electric power correcting unit 20.

For example, in cases where the electric power value of the transmission signal transmitted from the antenna 16 is lower than the desired electric power value, a correction signal is produced which indicates the heightening of the electric power of the transmission signal. In contrast, in cases where the electric power value of the transmission signal transmitted from the antenna 16 is higher than the desired electric power value, a correction signal is produced which indicates the lowering of the electric power of the transmission signal.

Here, a digital signal, which indicates the correction signal produced in the electric power correcting unit 20, is converted to an analog signal in the D/A converting unit 21, and the analog correction signal is transmitted to the variable attenuator 13.

Because the conventional CDMA type multiple transmission apparatus has the configuration described above, the electric power of the transmission signal transmitted from the antenna 16 can agree with the desired electric power value on condition that the electric powers of the pieces of transmission data output from the electric power control units 6 to 8 and the electric power of the transmission signal are correctly measured. However, in cases where a diode detection or the like is used to correctly measure the electric power of the transmission signal, a difference between an average value of the electric power and an effective value of the electric power becomes large because of the influence of a peak factor of the electric power. Therefore, there is a problem that the electric power of the transmission signal cannot be precisely corrected (though a unit is known, in which the effective value of the electric power is converted to a direct current voltage to measure the electric power of the transmission signal from the direct current voltage, since a response speed in the unit is low, the electric power of the transmission signal cannot be also precisely corrected in the unit).

Also, in cases where an electric power ratio among the electric powers of the pieces of transmission data set in the electric power control units 6 to 8 is changed, it is required to change the electric power table stored in the data storing unit 19 to another electric power table according to the changing of the electric power ratio. Therefore, in cases where the electric power ratio among the pieces of transmission data is changed in an online operation, it is required to store a plurality of electric power tables corresponding to various electric power ratios in advance. However, because a large number of electric power ratios exist, it is not realistic to store a plurality of electric power tables fitted to all types of electric power ratios. Therefore, there is another problem that the electric power ratio of the pieces of transmission data set in the electric power control units 6 to 8 is limited.

SUMMARY OF THE INVENTION

An object of the present invention is to provide, with due consideration to the drawbacks of the conventional CDMA type multiple transmission apparatus and the conventional CDMA type multiple transmission method, a CDMA type multiple transmission apparatus and a CDMA type multiple transmission method in which an electric power of a transmission signal is precisely corrected without storing an electric power table fitted to an electric power ratio of pieces of transmission data.

A CDMA type multiple transmission apparatus according to the present invention comprises
spread modulating means for spread-modulating pieces of transmission data of a plurality of channels by multiplying the transmission data of each channel by a spread code;
multiplexing means for multiplexing the pieces of transmission data, which are spread-modulated by the spread modulating means, with each other and outputting a base band signal;
transmitting means for orthogonally modulating the base band signal output by the multiplexing means and transmitting the base band signal orthogonally modulated as a transmission signal;

receiving means for receiving the transmission signal transmitted by the transmitting means, orthogonally demodulating the transmission signal and outputting a demodulated base band signal; and correcting means for comparing the base band signal output by the multiplexing means with the demodulated base band signal output by the receiving means and correcting the base band signal output by the multiplexing means according to a compared result.

Therefore, an electric power of a transmission signal can be precisely corrected without storing an electric power table fitted to an electric power ratio of pieces of transmission data.

In the CDMA type multiple transmission apparatus according to the present invention, the correcting means comprises a D/A converting unit for converting a digital signal, which indicates the base band signal output by the multiplexing means, to an analog signal indicating the base band signal; a comparing unit for comparing the base band signal output by the D/A converting unit with the demodulated base band signal output by the receiving means; and a vector adjusting unit for correcting the base band signal output from the D/A converting unit according to an error signal, which indicates a compared result of the comparing unit, and outputting the corrected base band signal to the transmitting means.

Therefore, the configuration of the apparatus is not complicated, and the electric power of the transmission signal can be corrected.

In the CDMA type multiple transmission apparatus according to the present invention, the correcting means comprises an A/D converting unit for converting an analog signal, which indicates the demodulated base band signal output from the receiving means, to a digital signal indicating the demodulated base band signal; a comparing and correcting unit for comparing the base band signal output by the multiplexing means with the demodulated base band signal output from the A/D converting unit and correcting the base band signal output by the multiplexing means according to a compared result; and a D/A converting unit for converting a digital signal, which indicates the base band signal corrected in the comparing and correcting unit, to an analog signal, which indicates the base band signal corrected in the comparing and correcting unit, and outputting the analog signal to the transmitting means.

Therefore, the configuration of the apparatus is not complicated, and the electric power of the transmission signal can be corrected.

In the CDMA type multiple transmission apparatus according to the present invention, an amplitude of an I component and an amplitude of a Q component in the base band signal are corrected by the correcting means.

Therefore, the electric power of the transmission signal can be precisely corrected.

In the CDMA type multiple transmission apparatus according to the present invention, a phase of an I component and a phase of a Q component in the base band signal are corrected by the correcting means.

Therefore, the electric power of the transmission signal can be precisely corrected.

A CDMA type multiple transmission method according to the present invention comprises the steps of:

spread-modulating pieces of transmission data of a plurality of channels by multiplying the transmission data of each channel by a spread code;

multiplexing the pieces of transmission data spread-modulated with each other to output a base band signal;

orthogonally modulating the base band signal;

transmitting the base band signal orthogonally modulated as a transmission signal;

receiving the transmission signal;

orthogonally demodulating the transmission signal to output a demodulated base band signal;

comparing the base band signal, which is obtained by multiplexing the pieces of transmission data spread-modulated with each other, with the demodulated base band signal orthogonally demodulated; and correcting the base band signal, which is obtained by multiplexing the pieces of transmission data spread-modulated with each other, according to a compared result of the comparing step.

Therefore, an electric power of a transmission signal can be precisely corrected without storing an electric power table fitted to an electric power ratio of pieces of transmission data.

In the CDMA type multiple transmission method according to the present invention, the step of comparing the base band signal comprises the steps of converting a digital signal indicating the base band signal, which is obtained by multiplexing the pieces of transmission data spread-modulated with each other, to an analog signal indicating the base band signal; and comparing the analog signal indicating the base band signal with the demodulated base band signal orthogonally demodulated, and the step of correcting the base band signal includes the step of correcting the analog signal indicating the base band signal according to an error signal, which indicates the compared result of the comparing step.

Therefore, the configuration of an apparatus, to which this CDMA type multiple transmission method is applied, is not complicated, and the electric power of the transmission signal can be corrected.

In the CDMA type multiple transmission method according to the present invention, the step of comparing the base band signal comprises the steps of converting an analog signal, which indicates the demodulated base band signal orthogonally demodulated, to a digital signal indicating the demodulated base band signal; and comparing the base band signal, which is obtained by multiplexing the pieces of transmission data spread-modulated with each other, with the digital signal indicating the demodulated base band signal, and the step of correcting the base band signal comprises the steps of correcting the base band signal, which is obtained by multiplexing the pieces of transmission data spread-modulated with each other, according to the compared result of the comparing step; and converting a digital signal, which indicates the base band signal corrected in the correcting step, to an analog signal which indicates the base band signal corrected in the correcting step.

Therefore, the configuration of an apparatus, to which this CDMA type multiple transmission method is applied, is not complicated, and the electric power of the transmission signal can be corrected.

In the CDMA type multiple transmission method according to the present invention, the step of correcting the base band signal includes the step of correcting an amplitude of an I component and an amplitude of a Q component in the base band signal.

Therefore, the electric power of the transmission signal can be precisely corrected.

In the CDMA type multiple transmission method according to the present invention, the step of correcting the base band signal includes the step of correcting a phase of an I component and a phase of a Q component in the base band signal.

Therefore, the electric power of the transmission signal can be precisely corrected.

DETAILED DESCRIPTION OF THE PREFERRED EMBODIMENTS

The invention will now be described with reference to the accompanying drawings.

Embodiment 1

Figure 1:
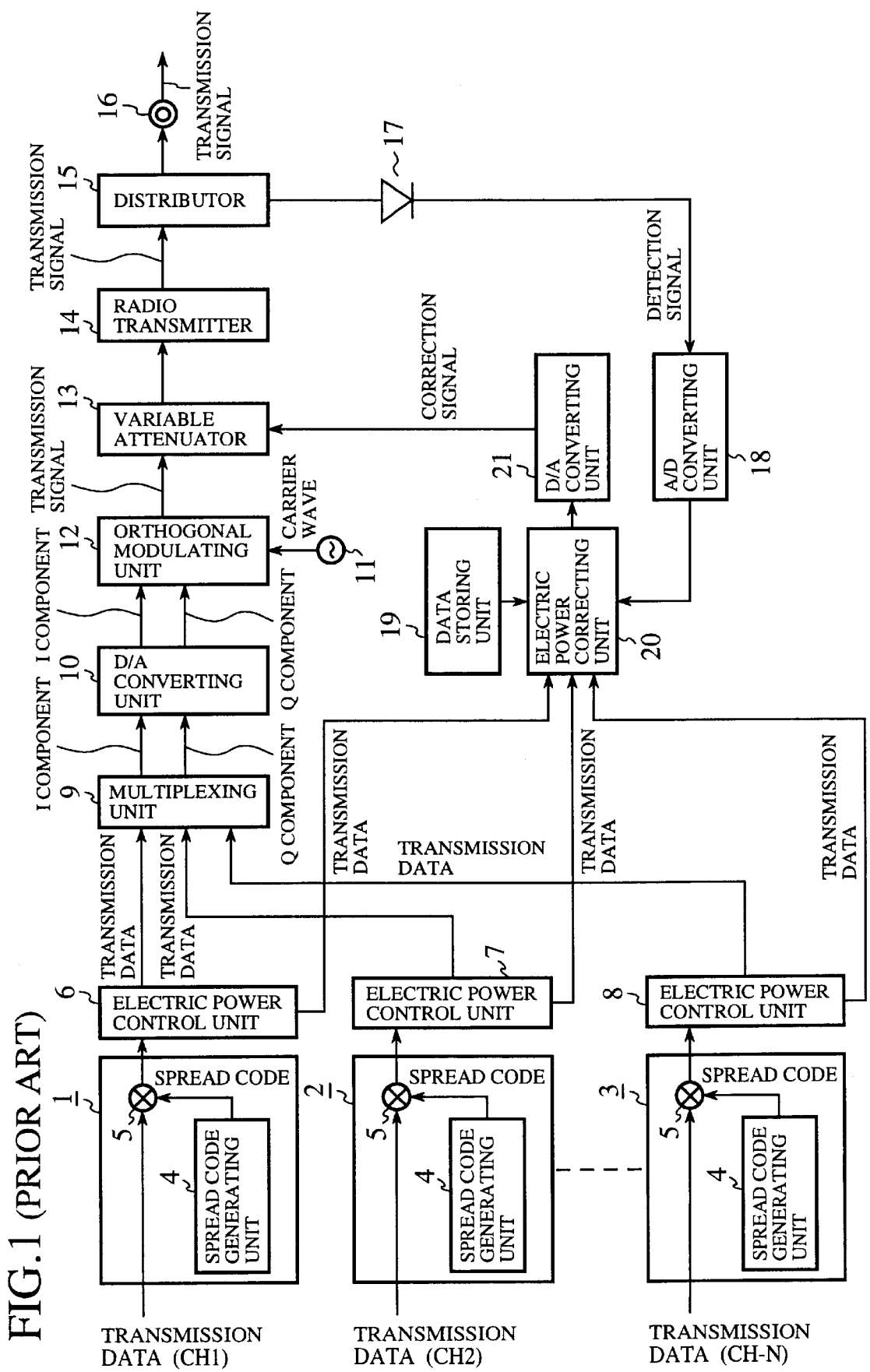
FIG. 1 is a constitutional diagram of a conventional CDMA type multiple transmission apparatus.
Figure 2:
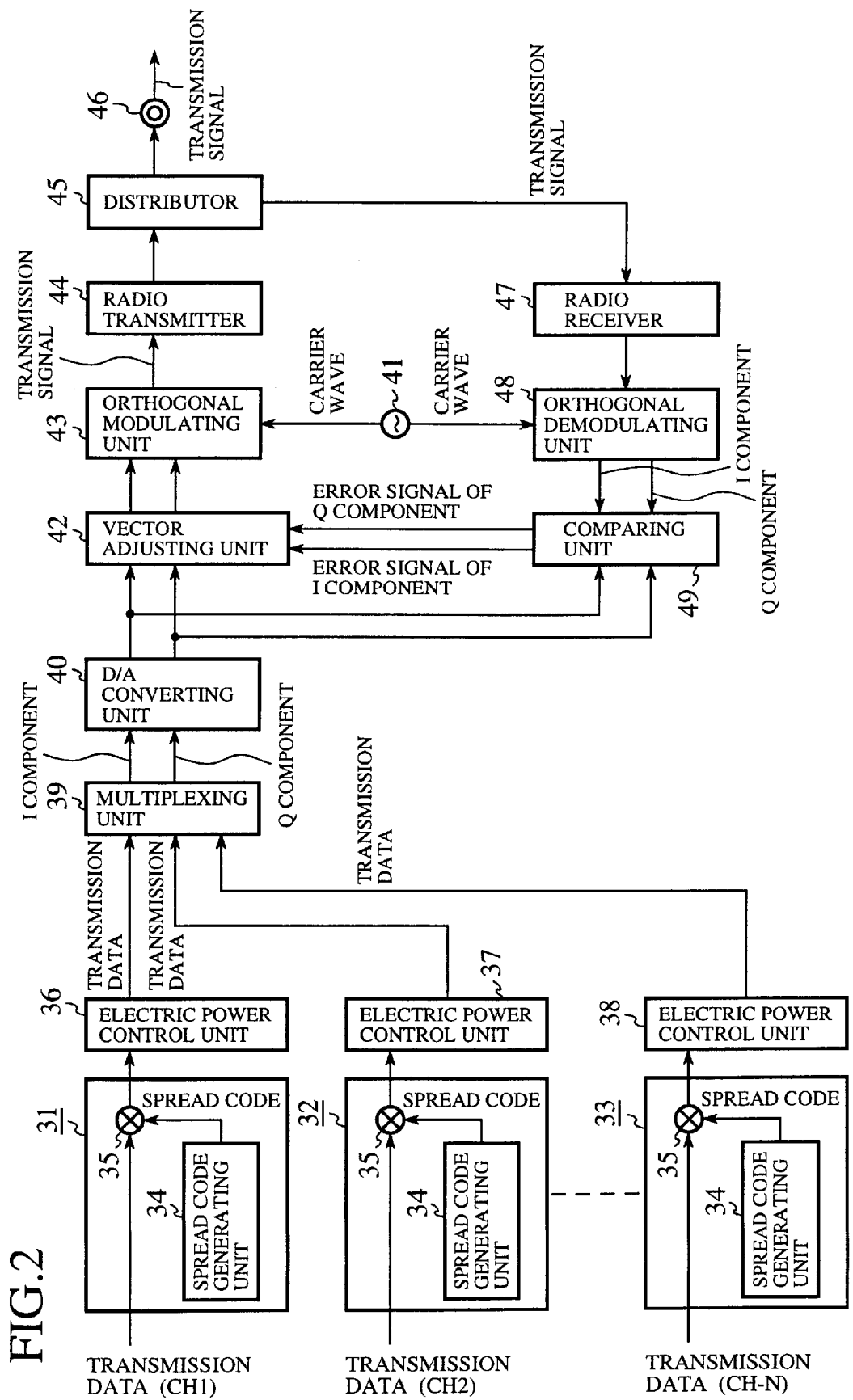
FIG. 2 is a constitutional diagram of a CDMA type multiple transmission apparatus according to a first embodiment of the present invention.

FIG. 2 is a constitutional diagram of a CDMA type multiple transmission apparatus according to a first embodiment of the present invention. In FIG. 2, 31 indicates a channel section (spread modulating means) in which transmission data of a channel CH1 is multiplied by a spread code, 32 indicates a channel section (spread modulating means) in which transmission data of a channel CH2 is multiplied by a spread code, 33 indicates a channel section (spread modulating means) in which transmission data of a channel CH-N (N=3, 4, - - - ) is multiplied by a spread code, 34 indicates a spread code generating unit for generating the spread code peculiar to the corresponding channel, and 35 indicates a mixer for multiplying the transmission data by the corresponding spread code.

Each of 36 to 38 indicates an electric power control unit for controlling an amplitude of the corresponding transmission data spread-modulated in the corresponding channel section 31, 32 or 33 and setting an electric power of the corresponding transmission data, 39 indicates a multiplexing unit for adding the pieces of transmission data output from the electric power control units 36 to 38 to each other to multiplex the pieces of transmission data with each other and outputting a base band signal (an I component and a Q component), 40 indicates a digital-to-analog (D/A) converting unit (correcting means) for converting a digital signal, which indicates the base band signal output from the multiplexing unit 39, to an analog signal indicating the base band signal, 41 indicates a carrier wave generating unit for generating a carrier wave, 42 indicates a vector adjusting unit (correcting means) for correcting the base band signal output from the D/A converting unit 40 according to error signals output from a comparing unit 49, 43 indicates an orthogonal modulating unit for orthogonally modulating the base band signal, which is corrected in the vector adjusting unit 42, with the carrier wave generated in the carrier wave generating unit 41 and outputting a transmission signal, 44 indicates a radio transmitter (transmitting means) for modulating the transmission signal, which is output from the orthogonal modulating unit 43, to a transmission signal of a radio frequency band, 45 indicates a distributor for distributing the transmission signal output from the radio transmitter 44, and 46 indicates an antenna for radiating the transmission signal distributed in the distributor 45.

47 indicates a radio receiver (receiving means) for receiving the transmission signal distributed in the distributor 45, 48 indicates an orthogonal demodulating unit (receiving means) for orthogonally demodulating the transmission signal received in the radio receiver 47 and outputting a demodulated base band signal, and 49 indicates the comparing unit (correcting means) for comparing the base band signal output from the D/A converting unit 40 with the demodulated base band signal output from the orthogonal demodulating unit 48 and outputting the error signals indicating a compared result.

Figure 3:
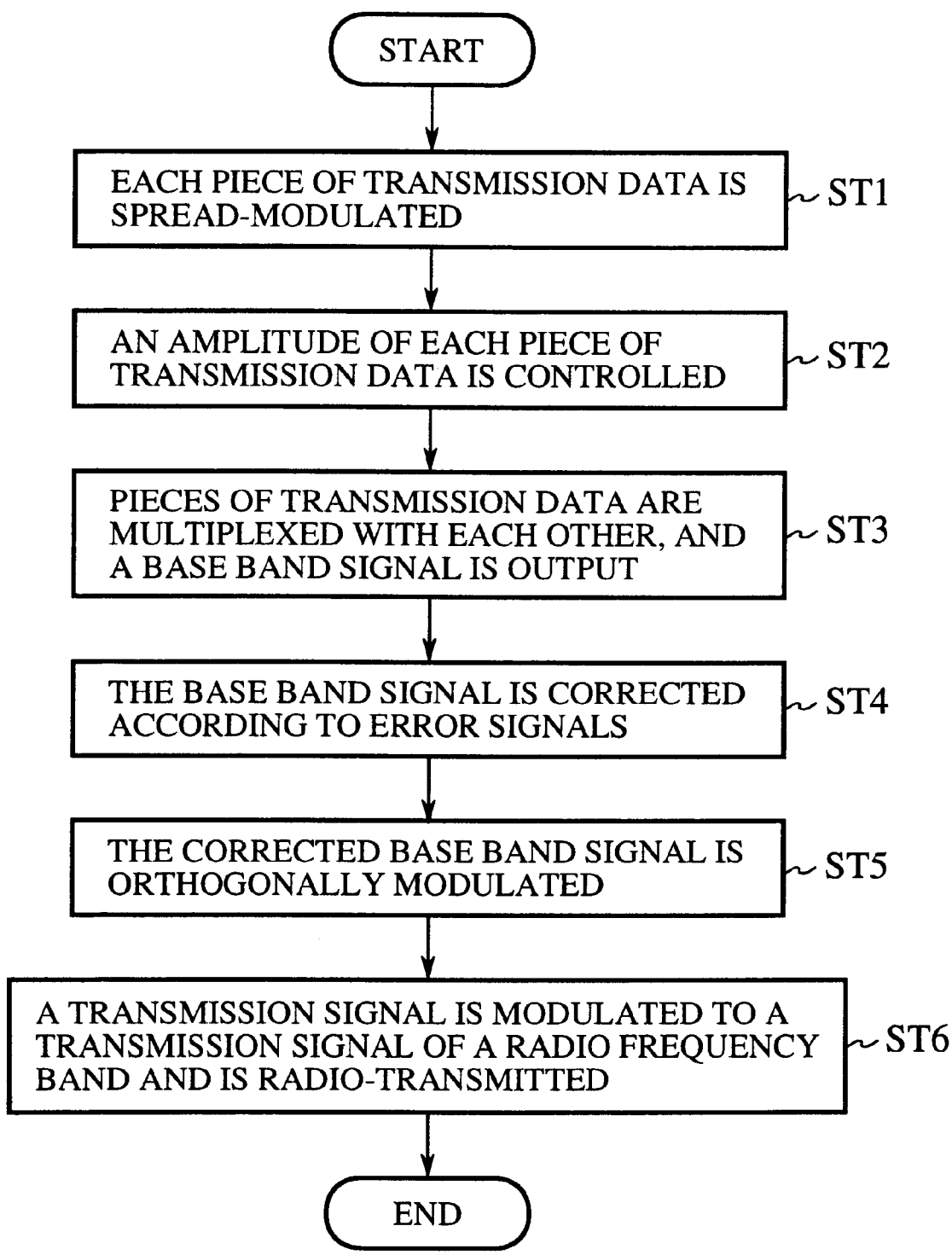
FIG. 3 is a flow chart showing the CDMA type multiple transmission method according to the first embodiment of the present invention.

FIG. 3 is a flow chart showing the CDMA type multiple transmission method according to the first embodiment of the present invention.

Next, an operation is described.

To spread pieces of transmission data of the channels CH1 to CH-N so as to produce transmission data of a wide frequency band for each channel, in each of the channel sections 31 to 33 corresponding to the channels CH1 to CH-N, the transmission data of a corresponding channel is multiplied by a spread code peculiar to the corresponding channel, and the pieces of transmission data of the channels CH1 to CH-N are respectively spread-modulated (step ST1).

After the pieces of transmission data of the channels CH1 to CH-N are respectively spread-modulated in the channel sections 31 to 33, amplitudes of the pieces of transmission data of the channels CH1 to CH-N are respectively controlled in the electric power control units 36 to 38 to set electric powers of the pieces of transmission data of the channels CH1 to CH-N to prescribed electric power values set in advance(step ST2).

After the amplitudes of the pieces of transmission data of the channels Ch1 to CH-N are controlled in the electric power control units 36 to 38, the pieces of transmission data of the channels Ch1 to CH-N output from the electric power control units 36 to 38 are added to each other in the multiplexing unit 39 to be multiplexed with each other, and a base band signal composed of an I component and a Q component is output (step ST3).

After a digital signal indicating the base band signal is converted to an analog signal in the D/A converting unit 40, the analog base band signal output from the D/A converting unit 40 is corrected in the vector adjusting unit 42 according to error signals output from the comparing unit 49 (step ST4).

That is, though the electric powers of the pieces of transmission data are set in the electric power control units 36 to 38, because there is a case where an electric power of the transmission signal transmitted from the antenna 46 deviates from a desired value for electric power, the base band signal is corrected in the vector adjusting unit 42 according to the error signals (the I component of the base band signal is corrected according to the error signal of the I component, and the Q component of the base band signal is corrected according to the error signal of the Q component).

For example, in cases where the error signal of the I component (or the Q component) indicates the heightening of the amplitude of the I component (or the Q component) of the base band signal, the base band signal is corrected to heighten the amplitude of the I component (or the Q component) of the base band signal. In contrast, in cases where the error signal of the I component (or the Q component) indicates the lowering of the amplitude of the I component (or the Q component) of the base band signal, the base band signal is corrected to lower the amplitude of the I component (or the Q component) of the base band signal. A method of producing the error signals is described later.

After the base band signal is corrected in the vector adjusting unit 42, the base band signal is orthogonally modulated in the orthogonal modulating unit 43 by using a carrier wave generated in the carrier wave generating unit 41, and a transmission signal is output (step ST5).

After the transmission signal is output from the orthogonal modulating unit 43, the transmission signal is modulated to a transmission signal of a radio frequency band in the radio transmitter 44, and the transmission signal is radio-transmitted through the antenna 46 (step ST6).

Therefore, the transmission signal is radio-transmitted. However, in cases where the electric power of the transmission signal deviates from a desired value for electric power, to set the electric power of the transmission signal to the desired electric power value, the transmission signal distributed in the distributor 45 is received in the radio receiver 47, the transmission signal is orthogonally demodulated in the orthogonal demodulating unit 48, and a demodulated base band signal is output from the orthogonal demodulating unit 48.

Thereafter, the I component of the base band signal output from the D/A converting unit 40 is compared in the comparing unit 49 with the I component of the demodulated base band signal output from the orthogonal demodulating unit 48, and the error signal of the I component is output. Also, the Q component of the base band signal output from the D/A converting unit 40 is compared in the comparing unit 49 with the Q component of the demodulated base band signal output from the orthogonal demodulating unit 48, and the error signal of the Q component is output.

For example, in cases where the electric power value of the transmission signal transmitted from the antenna 46 is lower than the desired electric power value, error signals are output which indicate the heightening of the electric power of the transmission signal. In contrast, in cases where the electric power value of the transmission signal transmitted from the antenna 46 is higher than the desired electric power value, the error signals are output which indicate the lowering of the electric power of the transmission signal.

Here, the error signals output from the comparing unit 49 are transmitted to the vector adjusting unit 42, and both the I component and the Q component of the base band signal to be output to the orthogonal modulating unit 43 are corrected according to the error signals as is described above.

As is apparently described above, in the first embodiment, the base band signal output from the D/A converting unit 40 is compared with the demodulated base band signal output from the orthogonal demodulating unit 48, and the base band signal output from the D/A converting unit 40 is corrected according to the compared result. Accordingly, the electric power of the transmission signal can be precisely corrected without storing an electric power table fitted to an electric power ratio of the pieces of transmission data.

Embodiment 2

Figure 4:
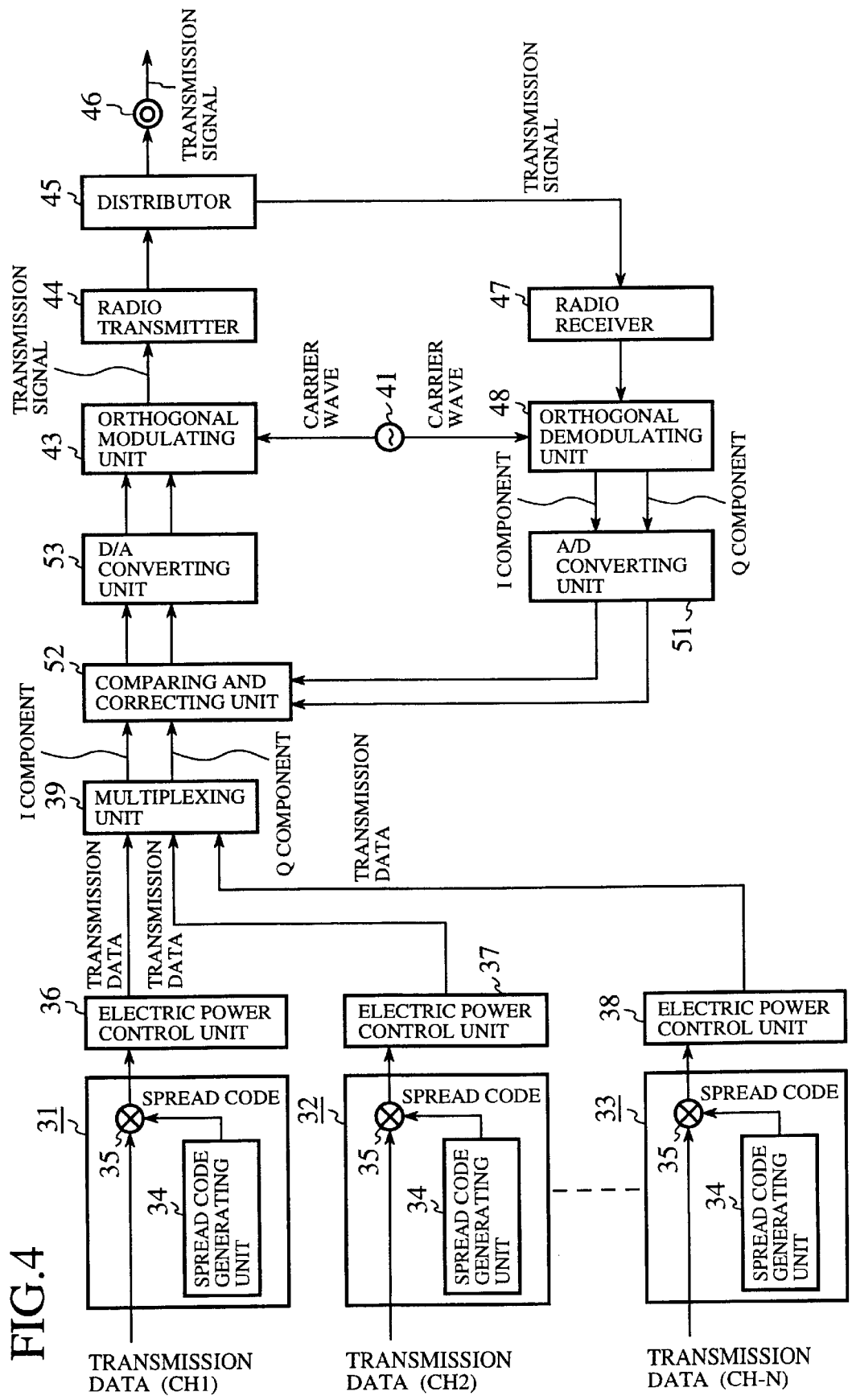
FIG. 4 is a constitutional diagram of a CDMA type multiple transmission apparatus according to a second embodiment of the present invention.

FIG. 4 is a constitutional diagram of a CDMA type multiple transmission apparatus according to a second embodiment of the present invention. In FIG. 4, constituent elements, which are indicated by the same reference numerals as those indicating the constituent elements of FIG. 2, are the same as those of FIG. 2, so that the description of the same constituent elements as those of FIG. 2 is omitted.

51 indicates an A/D converting unit (correcting means) for converting an analog signal, which indicates the demodulated base band signal output from the orthogonal demodulating unit 48, to a-digital signal indicating the demodulated base band signal, 52 indicates a comparing and correcting unit (correcting means) for comparing the base band signal output from the multiplexing unit 39 with the demodulated base band signal output from the A/D converting unit 51 and correcting the base band signal output from the multiplexing unit 39 according to a compared result, and 53 indicates a D/A converting unit (correcting means) for converting a digital signal, which indicates the base band signal corrected in the comparing and correcting unit 52, to an analog signal indicating the base band signal.

Next, an operation is described.

In the first embodiment, the analog base band signal output from the D/A converting unit 40 is compared in the comparing unit 49 with the analog demodulated base band signal output from the orthogonal demodulating unit 48, and the analog base band signal output from the D/A converting unit 40 is corrected in the vector adjusting unit 42. However, in the second embodiment, the digital base band signal output from the multiplexing unit 39 is compared in the comparing and correcting unit 52 with the digital demodulated base band signal output from the A/D converting unit 51, and the digital base band signal output from the multiplexing unit 39 is corrected according to a compared result in the comparing and correcting unit 52. Therefore, the same effect as that obtained in the first embodiment can be obtained.

Embodiment 3

In the first and second embodiments, the amplitudes of both the I component and the Q component of the base band signal are corrected according to the compared result in the vector adjusting unit 42 or the comparing and correcting unit 52. However, it is applicable that phases of both the I component and the Q component of the base band signal be corrected according to the compared result in the vector adjusting unit 42 or the comparing and correcting unit 52. Therefore, the same effect as that obtained in the first and second embodiments can be obtained.

As is described above, the CDMA type multiple transmission apparatus and the CDMA type multiple transmission method according to the present invention are suitable to prevent the interference between channels by controlling a transmission electric power of a transmission signal in cases where pieces of transmission data of a plurality of channels are multiplexed with each other and are transmitted as the transmission signal.

What is claimed is:

1. A CDMA type multiple transmission apparatus, comprising:

spread modulating means for spread-modulating pieces of transmission data of a plurality of channels by multiplying the transmission data of each channel by a spread code;

multiplexing means for multiplexing the pieces of transmission data, which are spread-modulated by the spread modulating means, with each other and outputting a base band signal;

transmitting means for orthogonally modulating the base band signal output by the multiplexing means and transmitting the base band signal orthogonally modulated as a transmission signal;

receiving means for receiving the transmission signal transmitted by the transmitting means, orthogonally demodulating the transmission signal and outputting a demodulated base band signal; and correcting means for comparing the base band signal output by the multiplexing means with the demodulated base band signal output by the receiving means and correcting the base band signal output by the multiplexing means according to a compared result.

2. A CDMA type multiple transmission apparatus according to claim 1, wherein the correcting means comprises:
- a D/A converting unit for converting a digital signal, which indicates the base band signal output by the multiplexing means, to an analog signal indicating the base band signal;
- a comparing unit for comparing the base band signal output by the D/A converting unit with the demodulated base band signal output by the receiving means; and
- a vector adjusting unit for correcting the base band signal output from the D/A converting unit according to an error signal, which indicates a compared result of the comparing unit, and outputting the corrected base band signal to the transmitting means.

3. A CDMA type multiple transmission apparatus according to claim 1, wherein the correcting means comprises:
- an A/D converting unit for converting an analog signal, which indicates the demodulated base band signal output from the receiving means, to a digital signal indicating the demodulated base band signal;
- a comparing and correcting unit for comparing the base band signal output by the multiplexing means with the demodulated base band signal output from the A/D converting unit and correcting the base band signal output by the multiplexing means according to a compared result; and
- a D/A converting unit for converting a digital signal, which indicates the base band signal corrected in the comparing and correcting unit, to an analog signal, which indicates the base band signal corrected in the comparing and correcting unit, and outputting the analog signal to the transmitting means.

4. A CDMA type multiple transmission apparatus according to claim 1, wherein an amplitude of an I component and an amplitude of a Q component in the base band signal are corrected by the correcting means.

5. A CDMA type multiple transmission apparatus according to claim 1, wherein a phase of an I component and a phase of a Q component in the base band signal are corrected by the correcting means.

6. A CDMA type multiple transmission method, comprising the steps of:
- spread-modulating pieces of transmission data of a plurality of channels by multiplying the transmission data of each channel by a spread code;
- multiplexing the pieces of transmission data spread-modulated with each other to output a base band signal;
- orthogonally modulating the base band signal;
- transmitting the base band signal orthogonally modulated as a transmission signal;
- receiving the transmission signal;
- orthogonally demodulating the transmission signal to output a demodulated base band signal;
- comparing the base band signal, which is obtained by multiplexing the pieces of transmission data spread-modulated with each other, with the demodulated base band signal orthogonally demodulated; and
- correcting the base band signal, which is obtained by multiplexing the pieces of transmission data spread-modulated with each other, according to a compared result of the comparing step.

7. A CDMA type multiple transmission method according to claim 6, wherein the step of comparing the base band signal comprises the steps of:
- converting a digital signal indicating the base band signal, which is obtained by multiplexing the pieces of transmission data spread-modulated with each other, to an analog signal indicating the base band signal; and
- comparing the analog signal indicating the base band signal with the demodulated base band signal orthogonally demodulated, and the step of correcting the base band signal includes the step of:
- correcting the analog signal indicating the base band signal according to an error signal, which indicates the compared result of the comparing step.

8. A CDMA type multiple transmission method according to claim 6, wherein the step of comparing the base band signal comprises the steps of:
- converting an analog signal, which indicates the demodulated base band signal orthogonally demodulated, to a digital signal indicating the demodulated base band signal; and
- comparing the base band signal, which is obtained by multiplexing the pieces of transmission data spread-modulated with each other, with the digital signal indicating the demodulated base band signal, and the step of correcting the base band signal comprises the steps of:
- correcting the base band signal, which is obtained by multiplexing the pieces of transmission data spread-modulated with each other, according to the compared result of the comparing step; and
- converting a digital signal, which indicates the base band signal corrected in the correcting step, to an analog signal which indicates the base band signal corrected in the correcting step.

9. A CDMA type multiple transmission method according to claim 6, wherein the step of correcting the base band signal includes the step of:
- correcting an amplitude of an I component and an amplitude of a Q component in the base band signal.

10. A CDMA type multiple transmission method according to claim 6, wherein the step of correcting the base band signal includes the step of:
- correcting a phase of an I component and a phase of a Q component in the base band signal.

* * * * *

UNITED STATES PATENT AND TRADEMARK OFFICE
CERTIFICATE OF CORRECTION

PATENT NO. : 6,442,192 B1
DATED : August 27, 2002
INVENTOR(S) : Haruyasu Senda

It is certified that error appears in the above-identified patent and that said Letters Patent is hereby corrected as shown below:

<u>Column 8,</u>
Line 28, "advance(step ST2)." should be -- advance (step ST2). --.

<u>Column 9,</u>
Line 64, "a-digital" should be -- a digital --.

Signed and Sealed this

Fourth Day of March, 2003

JAMES E. ROGAN
*Director of the United States Patent and Trademark Office*